UNITED STATES PATENT OFFICE.

WILLIAM HENRY PURDY, OF BROOKLYN, ASSIGNOR, BY MESNE ASSIGNMENTS, TO THE UNITED STATES SILVERED STEEL COMPANY, OF GREENBURG, NEW YORK.

COMPOUND FOR PURIFYING IRON AND STEEL.

SPECIFICATION forming part of Letters Patent No. 322,557, dated July 21, 1885.

Application filed November 18, 1884. (Specimens.)

*To all whom it may concern:*

Be it known that I, WILLIAM HENRY PURDY, a citizen of the United States, residing at Brooklyn, Kings County, New York, have invented new and useful Improvements in Compound for Purifying Iron and Steel, of which the following is a specification.

It is the purpose of my invention to provide a composition of matter which may be used for eliminating the native impurities of high steel and white iron and similar metals.

My invention consists in the compound hereinafter fully described, and covered by the claims annexed to this specification. I take of minium or red lead ($Pb_3O_4$) and of litharge (PbO) one pound of each, and mingle therewith one-fourth of a pound of cinnabar (HgS). To this mixture I add about three pounds of loam, molding-sand, or a similar material, and one gallon of water, and stir the whole until a thorough mechanical combination is effected. This composition I put up in packages of suitable size for sale in the market.

The manner of using the above compound is as follows: In fusing the metal, either in a ladle, crucible, or other vessel, the interior thereof is lined with the compound to a thickness of about one-fourth of an inch. The metal being then melted therein and allowed to remain after fusion for a short period, the substances entering into the composition combine with the native impurities which are thrown to the surface. For example, litharge having the property of readily combining with silicic acid at high temperature, and the red lead or minium evolving oxygen at a red heat, the melted metal is thrown into ebullition, the silicon, sulphur, and phosphorus are rapidly eliminated, and a certain percentage of the carbon combines with the oxygen of the minium, forming carbonic oxide, which burns upon the surface.

I have given the proportions of ingredients which I regard as preferable; but I do not limit myself to the exact quantities named, as these may be varied considerably without departing from my invention. It should be noted, also, that as minium or red lead parts with three atoms of oxygen when brought to a red heat, and is thereby converted into PbO or litharge, the latter may be omitted in forming the compound and red lead used instead, if desired.

If preferred, the compound may be used by smearing it upon the metal before it is placed in the furnace.

By the use of this compound I am able to produce a pure and remarkably tough fine-grained metal at a comparatively low cost.

When prepared in the manner described, the composition has essentially a pinkish color, and is about the consistency of paint. It may be applied with a brush or in any other suitable manner to the ladle, crucible, or other vessel, or to the metal itself.

I am aware that red lead and litharge have been heretofore used in various processes of purifying metals. By one mode of procedure a compound consisting of chromate of iron, sal-ammoniac, sal-soda, saleratus, York ore, litharge, and iron scale is placed in the cupola or blast-furnace. In another instance the vessel for containing the melted metal is coated with a composition of oxide of iron, red lead, and nitrate of soda.

The composition of matter which I employ is wholly different from any heretofore used. I do not claim, broadly, the use of red lead or litharge, singly or united, save in conjunction with the substances and in the manner heretofore set forth.

The present application is a division of the application filed by me of even date, Serial No. 148,248.

What I claim is—

1. A compound for the elimination of impurities from iron and steel, consisting of minium or red lead and cinnabar, with molding-sand and water, in substantially the proportions named.

2. A compound for eliminating the impurities from iron and steel, consisting of minium or red lead, litharge, and cinnabar mingled with molding-sand and water, in substantially the proportions specified.

In testimony whereof I affix my signature in presence of two witnesses.

WILLIAM HENRY PURDY.

Witnesses:
JAMES L. NORRIS,
JOS. L. COOMBS.